(No Model.) 3 Sheets—Sheet 1.
C. O. YALE, G. F. W. HOLMAN & W. J. BARNETTE.
ELECTRICAL VOTE RECORDING AND INDICATING APPARATUS.
No. 338,009. Patented Mar. 16, 1886.
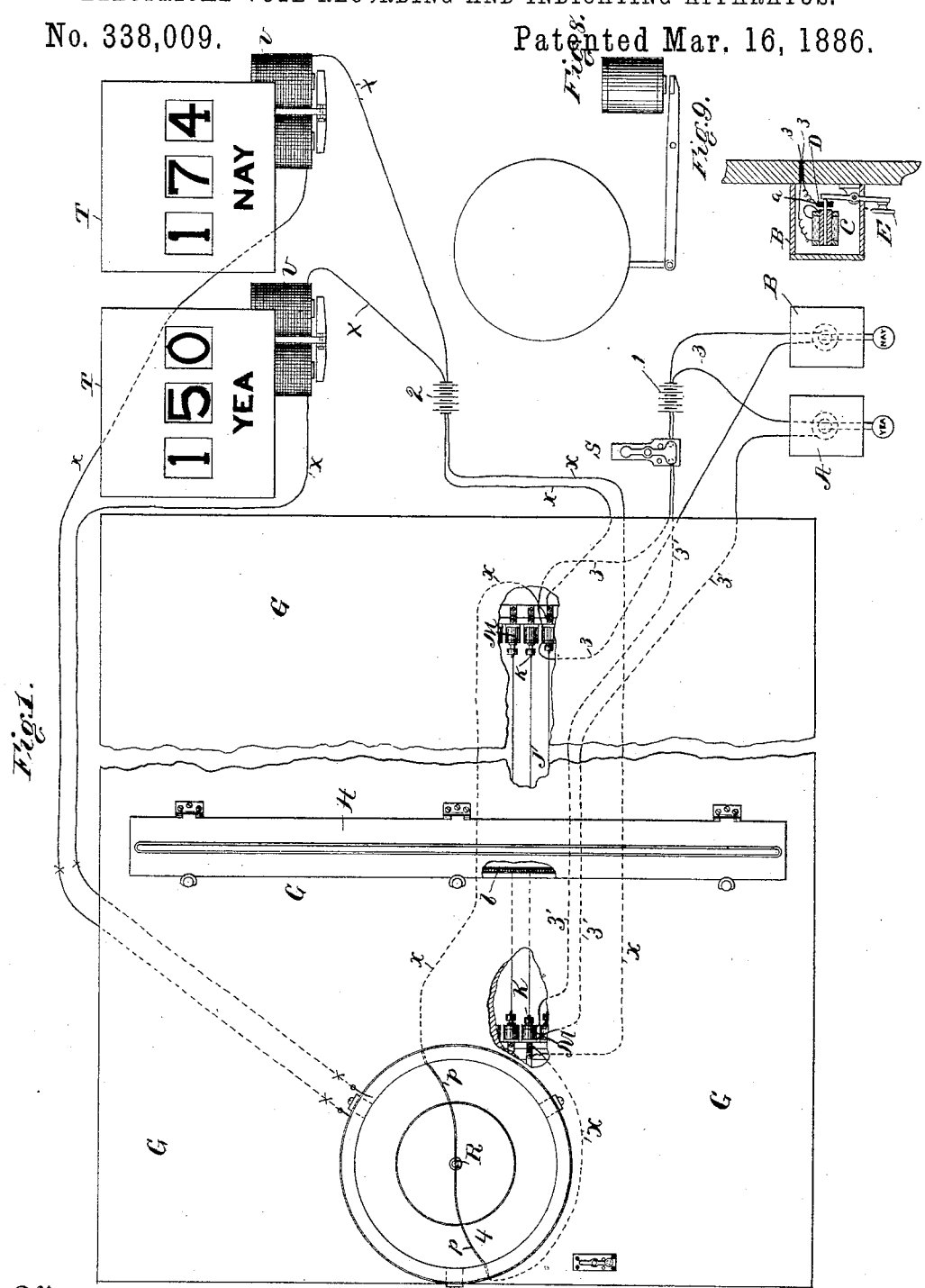

(No Model.) 3 Sheets—Sheet 2.
C. O. YALE, G. F. W. HOLMAN & W. J. BARNETTE.
ELECTRICAL VOTE RECORDING AND INDICATING APPARATUS.
No. 338,009. Patented Mar. 16, 1886.
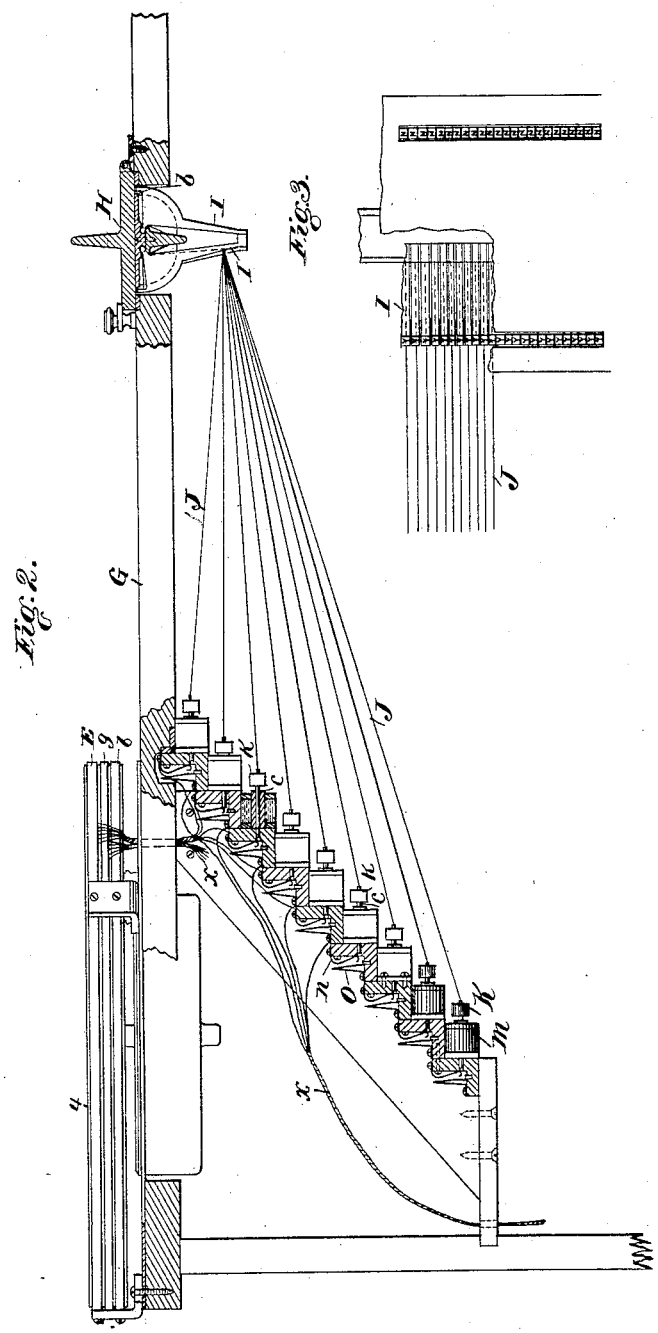

(No Model.) 3 Sheets—Sheet 3.
C. O. YALE, G. F. W. HOLMAN & W. J. BARNETTE.
ELECTRICAL VOTE RECORDING AND INDICATING APPARATUS.
No. 338,009. Patented Mar. 16, 1886.
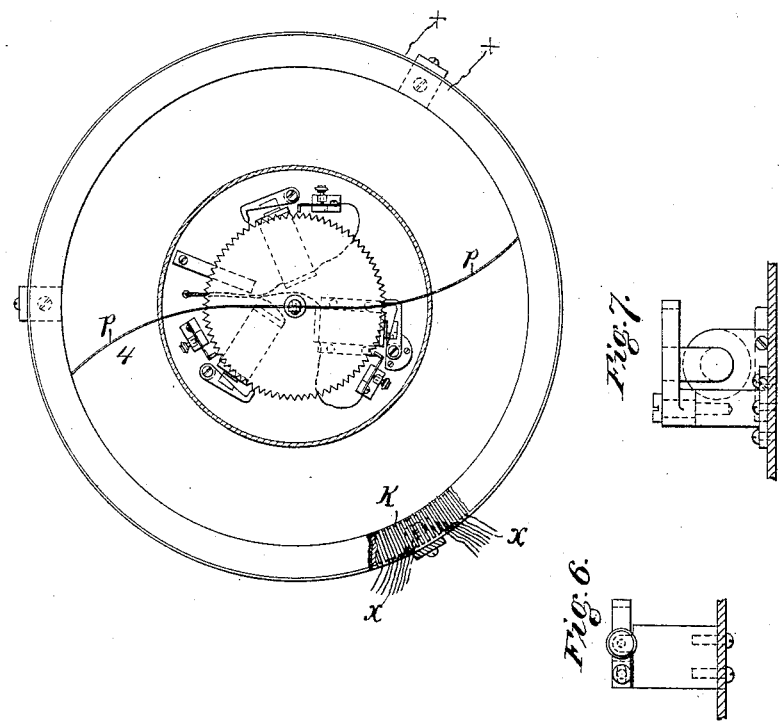
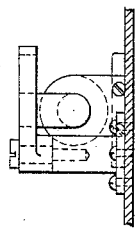
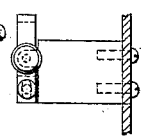
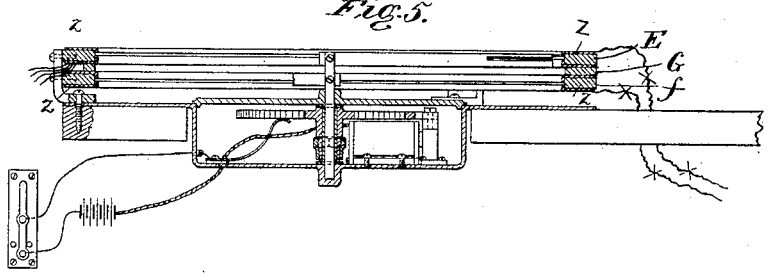

UNITED STATES PATENT OFFICE.

CHARLES O. YALE, OF ROME, NEW YORK, AND GEORGE F. W. HOLMAN AND WILLIAM J. BARNETTE, OF THE UNITED STATES NAVY; SAID HOLMAN ASSIGNOR TO SAID BARNETTE.

ELECTRICAL VOTE RECORDING AND INDICATING APPARATUS.

SPECIFICATION forming part of Letters Patent No. 338,009, dated March 16, 1886.

Application filed October 17, 1885. Serial No. 180,171. (No model.)

*To all whom it may concern:*

Be it known that we, CHARLES O. YALE, of Rome, New York, and GEORGE F. W. HOLMAN and WM. J. BARNETTE, of the United States navy, citizens of the United States, have invented new and useful Improvements in Electrical Vote Recording and Indicating Apparatus, of which the following is a specification.

This invention relates to electrical vote recording and indicating apparatus, designed particularly for use by legislative bodies.

The object of the apparatus is to provide means by which the members of legislative bodies may vote simultaneously on any question and the votes be speedily and accurately recorded and indicated in such manner as to show the total vote on both sides of a question, and by which also a record showing which way each member voted is made, and in this way rendering unnecessary all counting, &c., in order to determine the vote, thus effecting a great saving of valuable time.

It further provides the means for a rapid and accurate roll-call of said bodies.

With these objects in view, the invention consists of an apparatus comprising two primary electric circuits for each voter, the opening and closing of which are effected, respectively, by means of gravity-armatures and suitable magnets, the said armatures being operated by means of keys placed in suitable positions to be operated by each member, one circuit operating through suitable magnets and armatures and novel devices connected therewith to record an affirmative, and the other a negative, vote opposite each member's name, and also to indicate upon suitable dials, operated by a secondary circuit, the total number of affirmative and negative votes, respectively, that are cast.

The invention further consists in devices of novel construction and arrangement, combined with the primary and secondary circuits, whereby the objects of the invention are attained, all as will be hereinafter fully set forth.

In order that those skilled in the art to which our invention appertains may know how to make and use the same, we will now proceed to describe it in connection with the accompanying drawings, in which—

Figure 1 is a diagram showing the arrangement of the operative parts and the means of connecting and operating them. Fig. 2 is an elevation, partly in section, showing the means for performing the printing and closing the first break in the secondary circuit which operates the visual registering device, by means of the stems of the armatures, which operate the printing-levers in such manner that a number may be displayed corresponding with the number of votes cast, when the second break in the secondary circuit is closed at the concentrator. Fig. 3 is a plan view of a portion of the table upon which the slip of paper bearing the members' names rests during the process of printing and recording the votes. Fig. 4 is a plan view of a device for making the second metallic connection in the secondary circuit operating the visual registering device, said portion of the metallic connection being made and broken by means of the metallic brush when revolved against the inner surface of the concentrating-ring. Fig. 5 is a sectional view of the device shown in Fig. 4, and Figs. 6, 7, 8, and 9 represent various details employed in the device.

In these drawings similar letters refer to like parts in the several figures.

A B represent two boxes or cases placed in any suitable and easily-accessible position on the desks of the several members of the body by which the apparatus is used, and to whom only it is accessible. Within each of these cases is a magnet, C, connected by wire 3 to a battery, 1, and a gravity-armature, D, connected by wire 3' with a magnet, M, the normal position of which armature is a short distance below the said magnet.

Pivoted in the side of the cases or boxes is a key, E, one end of which rests beneath and supports the gravity-armature, while the other projects outward beyond the casing and is provided with a push-button, pressure on which brings the armature D, carrying a circuit-closer, into contact with the magnet-circuit closer, and thus an electrical connection at this point, *a*, is made between the line and battery wire 3 and the circuit completed and maintained independent of the push-button E. We do not wish, however, to be understood as limiting ourselves to this precise manner of closing the circuit, as described, but prefer it, for instead of employing the push-button E with the gravity-armature D of the magnet at A B a simple circuit-closing button or other device could be used to excite the magnet M, and thus move the printing-armature K toward it, which armature K may carry an independent circuit-closer, and thereby maintain a circuit independent of the push-button. It is important that the circuit when once established in the printing apparatus by a member voting cannot be interrupted while the vote is being taken by the machine.

G represents a table upon which is arranged a hinged door or panel, H, upon the under face of which is secured a strip of paper bearing a list of names of all persons entitled to a vote in the body in which the apparatus is used. These names are arranged in a column, or a plain strip of paper may be used and the names printed when the vote is cast, and the paper may be made plain, so there will be no confusion of names and votes by the change of the length of the paper by motion or otherwise. On the under side of this table G are arranged two series of pivoted levers, I, arranged so that each lever of one series shall be directly under a name on the list, and each corresponding lever of the opposite series being under the same name on the other side. Each of these levers has a long depending arm, I, and a short horizontal arm provided with a small upturned point, $b$, which projects through a suitably-arranged opening in the table. One series of levers I has upon the end $b$ thereof the word "yea," or some symbol to represent it, while upon the ends $b$ of the other series is the word "nay," or some symbol to represent it. Between the end $b$ of these levers and the paper bearing the names of the members is interposed an inked ribbon or some other means of making a mark, so that when the lever on either side under a given name is raised either a negative or an affirmative vote is recorded. We do not, however, wish to be understood as limiting ourselves to this precise arrangement, as, instead of the herein-described means of making a register, any means for making a mark in an appropriate column will answer the purpose. Nor do we wish to confine ourselves to registering yea or nay only, as the member's name can be printed at the same time. The movement of these levers I is accomplished by means of a connection, J, attached at one end to one of a series of armatures K, and at the other to the depending arm of the printing-lever. One pole of each of the magnets M, to which these armatures K are secured, is electrically connected by wire 3' with one of the operating-keys E, placed upon the voter's desk, and the other pole is connected by wire 3 to a battery, 1, those in circuit with the nay-key being placed in such position as to operate levers to print on one side of the strip bearing the names at one end of the name, and those in circuit with the yea-key being so situated as to operate levers on the opposite end of the same name. The wires 3', coming from the voters' desks, are each attached to one pole of a series of magnets, M, and the other pole to the battery 1, thus completing the primary circuit when the keys E at the desks are pressed, and throwing both magnets C and M into action and remaining so until the current is broken at S, when the two armatures D and K return to their normal positions. When a connection, $a$, is made at the voter's desk, the magnet M attracts the armature K and draws it back, thus moving out the lower depending arm of the lever I and forcing its upper end, $b$, up against the inked ribbon, and making an impression on the strip bearing the names of the voters. Simultaneously with this movement the steady-pin $c$, carrying the armature K, moves back in the hollow core of the magnet M and pushes the spring-lip $n$ with its electric connections against the projecting spring O with its electric connections, thus establishing one of the two breaks in the secondary circuit $x$, working the visual register T. This pin $c$ is preferably of hard rubber or some other non-conducting substance, and is provided with a pin or offset to prevent its being drawn entirely from the magnet.

The device for completing the second break in the secondary circuit $x$, which operates the visual register T, is shown in Figs. 4 and 5, and consists, preferably, of two circles, $e f$, made of some non-conducting substance, each faced on one side with a conductor, $z$, and arranged one above the other, with conducting sides farthermost removed, and a third insulating-ring, $g$, between them, with series of small metallic strips $k$ let in between the insulating-circles, which are connected by wires $x$ with the respective devices $n$ $o$, for closing the first break of the secondary circuit $x$. Each voter has his corresponding metallic strip in the yea and in the nay circles $e$ and $f$. In each circle $e f$ is mounted a spring-brush, $p$, the end of which is in contact with the inner circumference of the circle.

The concentrating-ring $e$, $f$, and $g$ is composed of three flat insulating-rings fastened together, and having a flat brass ring, $z$, on each flat exterior surface, formed with flanges on their inner edges to lap a little on the inside surface of the concentrator. From these metal rings are wires $x$, leading to the visual registers T, one to the yea and the other to the nay.

Inlaid between the joints of the insulating-rings are electrical conductors $k$, corresponding in number to that of the members entitled to vote, the yeas in one series and the nays in the other. From these conductors $k$ are wires $x$, running to the backs of the printing-magnets M, where the first connection in the secondary circuit $x$ is made at $n\ o$ after the button E is pressed upon.

We do not wish to be understood as confining ourselves to this particular arrangement of the several parts of the rings $e\ f\ g$. The positions of the flat brass plates $z$ and the inlaid electrical conductors $k$ may be reversed or any other arrangement made by which we produce the same result. Centrally in the concentrating-ring is an upright revolving post, R, which carries two insulated brushes, $p$, of conducting material—one for the yeas and one for the nays—so formed that when revolved against the inner edges of the concentrating-ring they are bearing against the top and bottom conductors, $z$ and $k$, and when they arrive at the splines or inlaid electrical conductors $k$, connected with the first break, $n\ o$, at the printing-magnets M, if the first breaks $n\ o$ in the secondary circuits $x$ are closed by the members voting, the circuit to the visual register T is closed, the registering-magnet U is excited, and the vote registered. We prefer an electric motor for revolving the brushes, but any other means may be used. The visual registration T should be made by the clerk starting the brushes $p$ revolving after the members have voted.

In Fig. 1, at S, is a switch under the control of the clerk, where the circuit may be broken when all parts are restored to their normal condition. The brush $p$ is given a rotary motion, and in a revolution comes in contact with each metallic strip $k$ in succession, thus closing and opening through the brush the second break in the secondary circuit. When a button, E, is pressed at a desk, the printing-armature K is attracted, the pin $c$, thereto attached, closes the first break in the visual registering-circuit, as shown at $n\ o$, and when the revolving brush $p$ within the circle 4 reaches the corresponding metallic strip, $k$, the second break is closed, and the circuit is completed through the revolving brush $p$, flat brass ring Z, and by wire X to one pole of a magnet, U, operating the recording mechanism T, and from the other pole of said magnet U to the battery 2. From this it will be seen that a circuit is made and broken through a magnet, U, situated contiguous to the visual recording device T, and the motion of the armature of the said magnet is communicated to the said register. The visual register T is one of any desired form which may be operated by a minimum force. There are two of these visual registers, one to show as a number the affirmative, and the other the negative, vote. After the registration of the vote the switch-button S is turned. The circuit is thus broken and all parts restored to their normal position and the action of battery suspended.

We have described a button, E, circuit-closer $a$, magnets C and M, armatures D and K, and pin $c$ for closing and maintaining as long as desired a circuit which, by appropriate connections, operates a printing device and at the same time closes a first break, $n\ o$, in a secondary circuit operating a visual register, T; but we do not wish to be understood as confining ourselves to this particular method of accomplishing the said result, for other arrangements of magnets and armatures may be employed to accomplish the same result.

Having thus described our invention, what we claim as new, and desire to secure by Letters Patent, is—

1. In an electrical vote recording and indicating apparatus, a table having openings opposite the name of each voter, a strip of paper placed thereon, two series of printing-levers, I, arranged beneath the table, for printing through the holes, magnets having armatures, connections J, for operating the levers, and a device for making and breaking the circuit in which the magnets are placed, substantially as described.

2. In an electrical voting apparatus, the table having the openings for the reception of the printing-levers, and provided with an inked ribbon and a strip of paper, the printing-levers I, arranged in two series beneath the table, each connected with one of the series of operating-magnets, the magnets having armatures, the connections J, the device for making and breaking the circuit, and the visual recording device, substantially as herein described.

3. In an electrical vote recording and indicating apparatus, the combination, with two electric circuits, of the printing mechanism, the device for making and breaking the first connection in the secondary circuits, the connection made by the armature and core of the operating-magnets, standard O, and spring-fingers N, and the device for making and breaking the secondary circuit, consisting of the ring composed of insulated pieces of metal and metal rings to which the wires are connected, and the revolving brushes.

4. In an electrical vote recording and indicating apparatus, the combination, with the two electric circuits made by keys on the desks of the voters, of the printing mechanism consisting of the table having a strip of paper for the reception of the votes, and the two series of levers mounted beneath the table and projecting therethrough, and the operating-magnets operated by the electric circuit and connected by suitable connections with the levers, the device for making and breaking the secondary circuits, and the visual recording device.

5. In an electrical vote recording and indicating apparatus, the two electrical circuits made by the buttons upon the voters' desks, in which circuits are included the operating-magnets, the cores of whose armatures are free to slide back and forth, the spring-fingers operated by the said armature, the metal upright to which the line-wires are connected, and the device for making the second connection in the circuit, which consists of the two rings formed of the insulated metal strips and rings and the revolving brushes, the visual recording device and wires connecting the same with the apparatus for making the second break in the secondary circuits.

6. In an electrical vote recording and indicating apparatus, the electrical circuits made by the buttons upon the voters' desks, the concentrator of the votes, consisting of the insulated metal strips and rings and its revolving brushes, and the magnets in the circuit for operating the levers of the visual recorder.

7. In an electrical vote recording and indicating apparatus, the table upon which the votes are cast, the strip for printing upon, the ribbon containing the printing-ink, the hinged panel for securing the strip to be printed upon, and the type electrically operated.

8. In an electrical vote recording and indicating apparatus, the combination of the circuit for printing, in which is contained a circuit-closer, an armature, and a magnet with a loosely-fitting core, to make and break the secondary circuit, and buttons for closing the printing-circuit, substantially as described.

In testimony whereof we have hereunto set our hands, in the presence of two subscribing witnesses.

CHARLES O. YALE.
   GEORGE F. W. HOLMAN.
   W. J. BARNETTE.

Witnesses to signature of Charles O. Yale:
 M. M. DAVIS,
 K. S. PUTNAM.

Witnesses to signature of George F. W. Holman:
 R. C. PERSONS,
 T. B. HOWARD.

Witnesses to signature of W. J. Barnette:
 EVELYN H. BARNETTE,
 E. G. FLEYNE.